United States Patent
Han et al.

(10) Patent No.: US 11,490,415 B2
(45) Date of Patent: Nov. 1, 2022

(54) RANDOM ACCESS METHOD AND APPARATUS

(71) Applicant: Huawei Technologies Co., Ltd., Shenzhen (CN)

(72) Inventors: Yunbo Han, Shenzhen (CN);
Hongcheng Zhuang, Shenzhen (CN);
Bingguang Peng, Shanghai (CN);
Yongbo Zeng, Beijing (CN); Le Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/256,506

(22) PCT Filed: Nov. 28, 2018

(86) PCT No.: PCT/CN2018/117985
§ 371 (c)(1),
(2) Date: Dec. 28, 2020

(87) PCT Pub. No.: WO2020/015267
PCT Pub. Date: Jan. 23, 2020

(65) Prior Publication Data
US 2021/0282176 A1    Sep. 9, 2021

(30) Foreign Application Priority Data

Jul. 20, 2018  (CN) .......................... 201810803034.2
Nov. 2, 2018   (CN) .......................... 201811299622.3

(51) Int. Cl.
*H04W 74/00*   (2009.01)
*H04L 5/00*    (2006.01)
(Continued)

(52) U.S. Cl.
CPC ......... *H04W 74/004* (2013.01); *H04L 5/0048* (2013.01); *H04W 24/08* (2013.01); *H04W 74/0833* (2013.01)

(58) Field of Classification Search
CPC .......................... H04W 74/0833; H04W 74/00
See application file for complete search history.

(56) References Cited

U.S. PATENT DOCUMENTS

2020/0245200 A1* 7/2020 Xiong ................. H04W 56/001

OTHER PUBLICATIONS

InterDigital Inc., "Random Access Prioritization," 3GPP TSG-RAN WG2, RAN2#101bis, R2-1804815, Sanya, P.R. China, Apr. 16-20, 2018, 8 pages.
(Continued)

*Primary Examiner* — Kevin Kim
(74) *Attorney, Agent, or Firm* — Conley Rose, P.C.

(57) ABSTRACT

This application relates to the wireless communications field, and discloses a random access method and apparatus, to resolve a problem of how a terminal device selects an uplink to perform random access. The method includes: selecting, by a terminal device, a first uplink from at least two preconfigured uplinks to perform random access; and selecting, by the terminal device when random access performed by using the first uplink fails, a second uplink from the at least two uplinks to perform random access, where the at least two uplinks are communications links between the terminal device and a first network device, the first network device and the terminal device are located in a same cell, the first uplink is a normal uplink NUL, and the second uplink is a supplementary uplink SUL. In this way, the terminal device selects an uplink to perform random access.

20 Claims, 7 Drawing Sheets

(51) Int. Cl.
  *H04W 24/08*  (2009.01)
  *H04W 74/08*  (2009.01)

(56) References Cited

OTHER PUBLICATIONS

Huawei, et al., "Discussion on BeamFailureRecoveryTimer," 3GPP TSG-RAN WG2 Meeting 102, Busan, Korea, May 21-25, 2018, R2-1807970, 13 pages.
Ericsson, "Switch between SUL and NUL during ongoing RA procedure," 3GPP TSG-RAN WG2 AH 1807, Tdoc R2-1810067, Montreal, Canada, Jul. 2-6, 2018, 2 pages.
Huawei, et al., "Discussion on the support of SUL and SDL combinations(H024)," 3GPP TSG-RAN WG2 NR AH1807, R2-1810439, Montreal, Canada, Jul. 2-6, 2018, 3 pages.
CMCC, "Considerations on support of supplementary uplink frequency," R2-1709093, 3GPP TSG-RAN WG2 Meeting #99, Berlin, Germany, Aug. 21-25, 2017, 4 pages.

* cited by examiner

F1: SUL, for example, 1.8 GHz
F2: Non-SUL, for example, 3.5 GHz

RANDOM ACCESS METHOD AND APPARATUS

CROSS-REFERENCE TO RELATED APPLICATIONS

This application is a U.S. National Stage of International Patent Application No. PCT/CN2018/117985 filed on Nov. 28, 2018, which claims priority to Chinese Patent Application No. 201811299622.3 filed on Nov. 2, 2018 and Chinese Patent Application No. 201810803034.2 filed on Jul. 20, 2018. All of the aforementioned applications are hereby incorporated by reference in their entireties.

TECHNICAL FIELD

Embodiments of this application relate to the field of wireless communications, and in particular, to a random access method and apparatus.

BACKGROUND

In a new radio (new radio, NR) technology of a fifth generation mobile communications system, two uplinks may be configured: a normal uplink (normal uplink, NUL) and a supplementary uplink (supplementary uplink, SUL).

According to a standard NR protocol, a terminal device may perform random access by using the SUL or the NUL. A process may be as follows: The terminal device measures downlink reference signal received power (reference signal received power, RSRP), and compares the downlink reference signal received power with a first threshold. If the downlink reference signal received power is less than the first threshold, the terminal device may select the SUL to perform random access, or if the downlink reference signal received power is greater than or equal to the first threshold, the terminal device may select the NUL to perform random access. However, after random access performed by the terminal device by using the SUL or the NUL fails, there is no related solution for the terminal device to perform subsequent processing.

SUMMARY

Embodiments of this application provide a random access method and apparatus, to resolve a problem of how a terminal device continues to perform random access after random access fails.

According to a first aspect, a random access method is provided. At least two uplinks are preconfigured between a terminal device and a network device. To perform random access, the terminal device may first select a first uplink to from the at least two preconfigured uplinks perform random access, then determine whether random access performed by using the first uplink fails, and select, if the terminal device determines that random access performed by using the first uplink fails, a second uplink from the at least two preconfigured uplinks to perform random access. The first uplink is different from the second uplink.

After random access performed by using the first uplink fails, the terminal device selects the second uplink to perform random access, so that the terminal device continues a random access process after random access fails.

In a possible implementation, the at least two uplinks are communications links between the terminal device and a first network device, the first network device and the terminal device are located in a same cell, and when random access performed by the terminal device by using the second uplink fails, in other words, random access performed by using each of the first uplink and the second uplink fails, the terminal device may further continue to select a third uplink to perform random access. The third uplink is a communications link between the terminal device and a second network device, and the second network device is different from the first network device.

In a possible implementation, the first uplink is a normal uplink NUL, and the second uplink is a supplementary uplink SUL.

In a possible implementation, when the following condition is met, random access performed by the terminal device by using the first uplink fails, and the condition includes:

a quantity of consecutive failures of random access performed by the terminal device by using the first uplink reaches N1, where N1 is a positive integer greater than or equal to 1; or a quantity of times of reporting a random access problem reaches L1 because random access performed by the terminal device by using the first uplink fails, where L1 is a positive integer greater than or equal to 1; or a first timer of the first uplink is activated, where that the first timer is activated means that a quantity of consecutive failures of random access performed by the terminal device by using the first uplink reaches a first value, or a quantity of times of reporting a random access problem reaches a second value because random access performed by the terminal device by using the first uplink fails.

In a possible implementation, when the following condition is met, random access performed by the terminal device by using the second uplink fails, and the condition includes:

a quantity of consecutive failures of random access performed by the terminal device by using the second uplink reaches N2, where N2 is a positive integer greater than or equal to 1; or a quantity of times of reporting a random access problem reaches L2 because random access performed by the terminal device by using the second uplink fails, where L2 is a positive integer greater than or equal to 1; or a second timer of the second uplink is activated, where that the second timer is activated means that a quantity of consecutive failures of random access performed by the terminal device by using the second uplink reaches a third value, or a quantity of times of reporting a random access problem reaches a fourth value because random access performed by the terminal device by using the second uplink fails.

In a possible implementation, the third uplink may be a normal uplink NUL or a supplementary uplink SUL.

In a possible implementation, at least two first uplinks may be preconfigured for the terminal device, and when selecting the first uplink to perform random access, the terminal device may select each first uplink based on a priority of each first uplink to perform random access, and determine that random access performed by using the first uplink fails only when random access performed by using each first uplink fails.

In a possible implementation, at least two second uplinks may be preconfigured for the terminal device, and when selecting the second uplink to perform random access, the terminal device may select each second uplink based on a priority of each second uplink to perform random access, and determine that random access performed by using the second uplink fails only when random access performed by using each second uplink fails.

In a possible implementation, the terminal device may measure downlink reference signal received power, and compare a value of the downlink reference signal received power with a first threshold, and when the downlink reference signal received power is greater than or equal to the first threshold, the terminal device determines to select the first uplink to perform random access.

In a possible implementation, the terminal device receives configuration information sent by the first network device or a third network device. The configuration information is used to configure the first threshold.

In a possible implementation, the first network device may be an NR network device, and the third network device may be an LTE network device.

In a possible implementation, if the first threshold is configured by the first network device, a cell in which the first network device is located is a primary cell of the terminal device, and a cell in which the third network device is located is a secondary cell of the terminal device; and if the first threshold is configured by the third network device, the cell in which the third network device is located is the primary cell of the terminal device, and the cell in which the first network device is located is the secondary cell of the terminal device.

According to a second aspect, a random access apparatus is provided. The apparatus has a function of implementing the method in any one of the foregoing aspect and the possible implementations of the aspect. The function may be implemented by hardware, or may be implemented by hardware executing corresponding software. The hardware or the software includes one or more modules corresponding to the foregoing function.

In a possible implementation, the apparatus may be a chip or an integrated circuit.

In a possible implementation, the apparatus may include a transceiver and a processor. The transceiver is configured to receive and send data; and the processor is configured to: select a first uplink from at least two preconfigured uplinks, and perform random access based on the selected first uplink by using the transceiver; and when random access performed by using the first uplink fails, select a second uplink from the at least two uplinks, and perform random access based on the selected second uplink by using the transceiver. The first uplink is different from the second uplink.

In a possible implementation, the at least two uplinks are communications links between the apparatus and a first network device, the first network device and the apparatus are located in a same cell, and the processor is further configured to: when random access performed by using the second uplink fails, continue to select a third uplink, and perform random access based on the selected third uplink by using the transceiver. The third uplink is a communications link between the apparatus and a second network device, and the second network device is different from the first network device.

In a possible implementation, the first uplink may be a normal uplink NUL, and the second uplink may be a supplementary uplink SUL. In a possible implementation, the third uplink may be a normal uplink NUL or a supplementary uplink SUL.

In a possible implementation, at least two first uplinks may be preconfigured for the apparatus, and when selecting the first uplink to perform random access, the processor is specifically configured to select each first uplink based on a priority of each first uplink to perform random access.

In a possible implementation, at least two second uplinks may be preconfigured for the apparatus, and when selecting the second uplink to perform random access, the processor is specifically configured to select each second uplink based on a priority of each second uplink to perform random access.

In a possible implementation, when the following condition is met, random access performed by the apparatus by using the first uplink fails, and the condition includes:

a quantity of consecutive failures of random access performed by the apparatus by using the first uplink reaches N1, where N1 is a positive integer greater than or equal to 1; or a quantity of times of reporting a random access problem reaches L1 because random access performed by the apparatus by using the first uplink fails, where L1 is a positive integer greater than or equal to 1; or a first timer of the first uplink is activated, where that the first timer is activated means that a quantity of consecutive failures of random access performed by the apparatus by using the first uplink reaches a first value, or a quantity of times of reporting a random access problem reaches a second value because random access performed by the apparatus by using the first uplink fails.

In a possible implementation, when the following condition is met, random access performed by the apparatus by using the second uplink fails, and the condition includes:

a quantity of consecutive failures of random access performed by the apparatus by using the second uplink reaches N2, where N2 is a positive integer greater than or equal to 1; or a quantity of times of reporting a random access problem reaches L2 because random access performed by the apparatus by using the second uplink fails, where L2 is a positive integer greater than or equal to 1; or a second timer of the second uplink is activated, where that the second timer is activated means that a quantity of consecutive failures of random access performed by the apparatus by using the second uplink reaches a third value, or a quantity of times of reporting a random access problem reaches a fourth value because random access performed by the apparatus by using the second uplink fails.

In a possible implementation, the processor is further configured to measure downlink reference signal received power, and when the processor selects the first uplink to perform random access, the processor is configured to determine to select the first uplink when the downlink reference signal received power is greater than or equal to a first threshold.

In a possible implementation, the transceiver is further configured to receive configuration information sent by the first network device or a third network device. The configuration information is used to configure the first threshold, and the first network device is different from the third network device.

In a possible implementation, the first network device may be an NR network device, and the third network device may be an LTE network device.

In a possible implementation, if the first threshold is configured by the first network device, a cell in which the first network device is located is a primary cell of the apparatus, and a cell in which the third network device is located is a secondary cell of the apparatus; and if the first threshold is configured by the third network device, the cell in which the third network device is located is the primary cell of the apparatus, and the cell in which the first network device is located is the secondary cell of the apparatus.

In a possible implementation, the apparatus may further include a memory, configured to store a program to be executed by the processor, and the processor performs the foregoing random access processing process by invoking the program stored in the memory.

In a possible implementation, the apparatus may be a terminal device.

According to a third aspect, this application provides a random access apparatus, including:

a processing unit, configured to select a first uplink from at least two preconfigured uplinks; and a transceiver unit, configured to perform random access based on the selected first uplink, where the processing unit is further configured to select a second uplink from the at least two uplinks when random access performed by using the first uplink fails;

the transceiver unit is further configured to perform random access based on the selected second uplink; and the at least two uplinks are communications links between the apparatus and a first network device, the first network device and the apparatus are located in a same cell, the first uplink is a normal uplink NUL, and the second uplink is a supplementary uplink SUL.

After random access performed by using the first uplink fails, the second uplink is selected to perform random access, so that the apparatus continues a random access process after random access fails.

In a possible implementation, when the following condition is met, random access performed by the apparatus by using the first uplink fails, and the condition includes:

a quantity of consecutive failures of random access performed by using the first uplink reaches N1, where N1 is a positive integer greater than or equal to 1; or a quantity of times of reporting a random access problem reaches L1 because random access performed by using the first uplink fails, where L1 is a positive integer greater than or equal to 1; or a first timer of the first uplink is activated, where that the first timer is activated means that a quantity of consecutive failures of random access performed by the apparatus by using the first uplink reaches a first value, or a quantity of times of reporting a random access problem reaches a second value because random access performed by the apparatus by using the first uplink fails.

In a possible implementation, the processing unit is further configured to select a third uplink to perform random access when random access performed by using the second uplink fails. The third uplink is a communications link between the apparatus and a second network device.

In a possible implementation, when the following condition is met, random access performed by the apparatus by using the second uplink fails, and the condition includes:

a quantity of consecutive failures of random access performed by using the second uplink reaches N2, where N2 is a positive integer greater than or equal to 1; or a quantity of times of reporting a random access problem reaches L2 because random access performed by using the second uplink fails, where L2 is a positive integer greater than or equal to 1; or a second timer of the second uplink is activated, where that the second timer is activated means that a quantity of consecutive failures of random access performed by the apparatus by using the second uplink reaches a third value, or a quantity of times of reporting a random access problem reaches a fourth value because random access performed by the apparatus by using the second uplink fails.

In a possible implementation, the processing unit is further configured to measure downlink reference signal received power, and when the processing unit selects the first uplink to perform random access, the processing unit is configured to select the first uplink to perform random access when the downlink reference signal received power is greater than or equal to a first threshold.

In a possible implementation, if at least two first uplinks are preconfigured, when the processing unit selects the first uplink to perform random access, the processing unit is configured to select each first uplink based on a priority of each first uplink to perform random access.

In a possible implementation, if at least two second uplinks are preconfigured, when the processing unit selects the second uplink to perform random access, the processing unit is configured to select each second uplink based on a priority of each second uplink to perform random access.

In a possible implementation, the third uplink is a normal uplink NUL or a supplementary uplink SUL.

In a possible implementation, the transceiver unit is further configured to receive configuration information sent by the first network device or a third network device. The configuration information is used to configure the first threshold.

In a possible implementation, the first network device is an NR network device, and the third network device is an LTE network device.

In a possible implementation, if the first threshold is configured by the first network device, a cell in which the first network device is located is a primary cell of the apparatus, and a cell in which the third network device is located is a secondary cell of the apparatus; and if the first threshold is configured by the third network device, the cell in which the third network device is located is the primary cell of the apparatus, and the cell in which the first network device is located is the secondary cell of the apparatus.

In a possible implementation, the apparatus may be a terminal device.

According to a fourth aspect, a terminal device is provided. The terminal device includes a memory and a processor. The memory stores a computer program. The processor is configured to invoke and execute the computer program stored in the memory, so that the terminal device performs the method in any one of the foregoing aspect and the possible implementations of the aspect.

According to a fifth aspect, a computer-readable storage medium is provided. The computer storage medium stores a computer-readable instruction, and when a computer reads and executes the computer-readable instruction, the computer is enabled to perform the method in any one of the foregoing aspect and the possible implementations of the aspect.

According to a sixth aspect, a computer program product is provided. When the computer program product is read and executed by a computer, the method in any one of the foregoing aspect and the possible implementations of the aspect is performed.

According to a seventh aspect, a chip is provided. The chip is coupled to a memory, and is configured to read and execute a software program stored in the memory, to implement the method in any one of the foregoing aspect and the possible implementations of the aspect.

DESCRIPTION OF EMBODIMENTS

The following describes in detail the embodiments of this application with reference to accompanying drawings.

Figure 1:
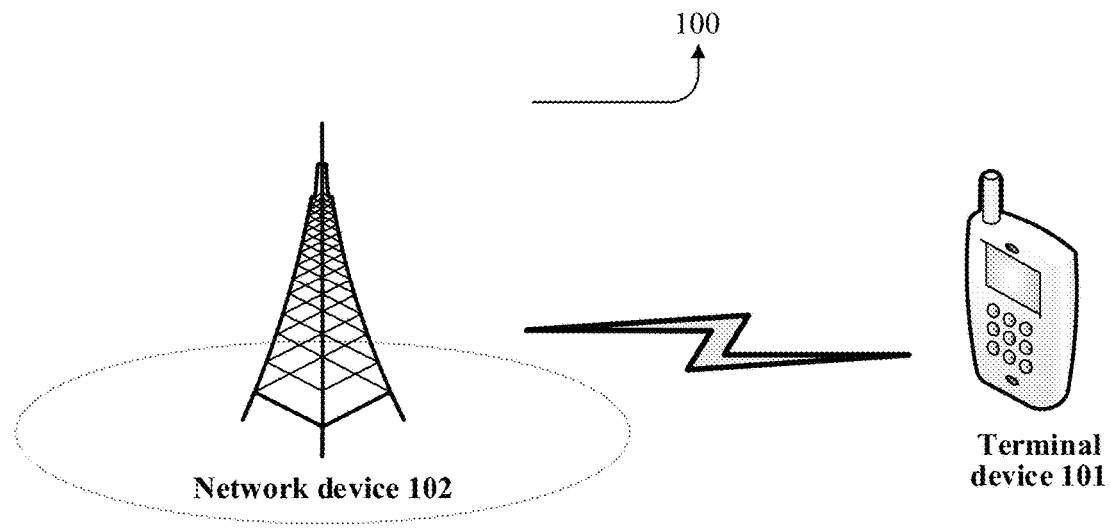
FIG. 1 is a schematic diagram of a random access system to which an embodiment of this application is applicable.

FIG. 1 is a schematic diagram of a random access system applicable to a random access method according to an embodiment of this application. As shown in FIG. 1, the random access system 100 includes a terminal device 101 and a network device 102. The terminal device 101 accesses the network device 102 by using a random access process.

In a wireless communications system, to establish a connection to the network device 102 and request the network device 102 to allocate a corresponding dedicated resource to the terminal device 101 to perform normal service transmission, the terminal device 101 usually first needs to perform random access to the network device 102. A scenario in which the terminal device triggers random access includes any one of the following scenarios:

Scenario 1: The terminal device establishes an initial radio resource control (radio resource control, RRC) connection. When the terminal device switches from an idle mode to a connected mode, the terminal device initiates random access.

Scenario 2: The terminal device re-establishes an RRC connection. When the terminal device needs to re-establish an RRC connection after a wireless connection fails, the terminal device initiates random access.

Scenario 3: When the terminal device performs a cell handover, the terminal device initiates random access in a target cell.

Scenario 4: When downlink data arrives, the terminal device is in a connected mode, and the network device needs to transmit the downlink data to the terminal device, but finds that the terminal device is in an uplink out-of-synchronization state, the network device controls the terminal device to initiate random access. An uplink timer is maintained on a network device side. If the uplink timer expires, and the network device does not receive a response signal from the terminal device, the network device considers that the terminal device is in the uplink out-of-synchronization state.

Scenario 5: When uplink data arrives, the terminal device is in a connected mode, and the terminal device needs to transmit the uplink data to the network device, but finds that the terminal device is in an uplink out-of-synchronization state, the terminal device initiates random access. An uplink timer is maintained on a terminal device side. If the uplink timer expires, and the terminal device does not receive a command for adjusting a maximum timing advance (time advanced, TA) value from the network device, the terminal device considers that the terminal device is in the uplink out-of-synchronization state.

In the following, some terms of the embodiments of this application are described, to help persons skilled in the art have a better understanding.

(1) The network device is a device that can provide a random access function for the terminal device or a chip that can be disposed in the device. The device includes but is not limited to an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, home evolved NodeB or home Node B, HNB), a baseband unit (baseband unit, BBU), an access point (access point, AP) in a wireless fidelity (wireless fidelity, Wi-Fi) system, a wireless relay node, a wireless backhaul node, a transmission point (transmission and reception point, TRP, or transmission point, TP), or the like, may be a gNB or a transmission point (TRP or TP) in a 5G system such as an NR system or one or one group of antenna panels (including a plurality of antenna panels) of a base station in a 5G system, or may be a network node forming a gNB or a transmission point, for example, a baseband unit (BBU) or a distributed unit (DU, distributed unit).

(2) The terminal device is also referred to as user equipment (UE), a mobile station (mobile station, MS), a mobile terminal (mobile terminal, MT), or the like, and is a device that provides voice and/or data connectivity for a user. For example, the terminal device includes a handheld device or an in-vehicle device having a wireless connection function. Currently, the terminal device may be a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(3). The term "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects.

In this application, "a plurality of" refers to two or more than two.

In addition, it should be understood that in the description of this application, words such as "first" and "second" are used only for distinguishing between description, and cannot be understood as an indication or implication of relative importance, or cannot be understood as an indication or implication of a sequence.

The network architecture and the service scenario described in the embodiments of this application are intended to describe the technical solutions in the embodiments of this application more clearly, and do not constitute a limitation on the technical solutions provided in the embodiments of this application. Persons of ordinary skill in the art may know that: With the evolution of the network architecture and the emergence of new service scenarios, the technical solutions provided in the embodiments of this application are also applicable to similar technical problems.

Figure 2A:
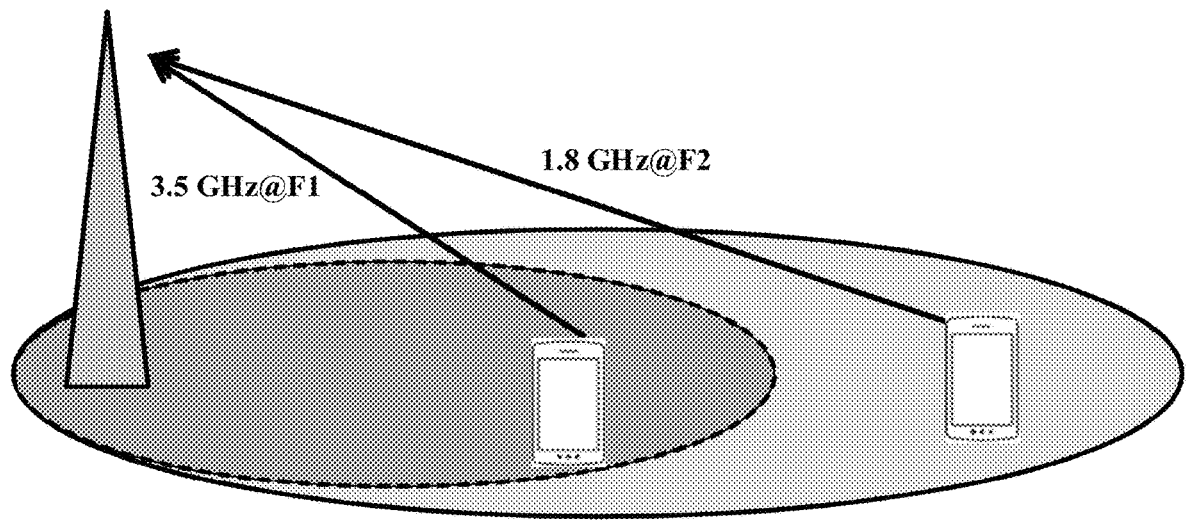
FIG. 2A is a schematic diagram of a random access system to which an embodiment of this application is applicable.

In addition, it should be noted that in an LTE system, an eNB and a terminal device perform uplink and downlink transmission by using a frequency band of 1.8 GHz@F2. In an NR system, a gNB and a terminal device perform uplink and downlink transmission by using a frequency band of 3.5 GHz@F1. In the NR system, the gNB has relatively large maximum downlink transmit power, and the terminal device has relatively limited maximum uplink transmit power. In this case, when a relatively high frequency band is used in the NR system, and uplink and downlink transmission are performed by using an NUL, uplink and downlink coverage areas are not equal, in other words, the NR uplink coverage area is far less than the NR downlink coverage area. Therefore, in comparison with the LTE system, a supplementary uplink (supplementary uplink, SUL) feature is introduced in the NR system. As shown in FIG. 2A, a relatively low frequency band is configured for an NR uplink, for example, the frequency band of 1.8 GHz@F2 currently used in an LTE frequency band, to resolve a problem that the uplink coverage area is far less than the downlink coverage area when a relatively high frequency band is used in the NR system. When the frequency band of 1.8 GHz@F2 is used for the NR uplink, a coverage area of the NR uplink is twice that of using the frequency band of 3.5 GHz@F1. The SUL feature helps an operator provide continuous coverage to enhance mobile experience of a terminal device.

Figure 2B:
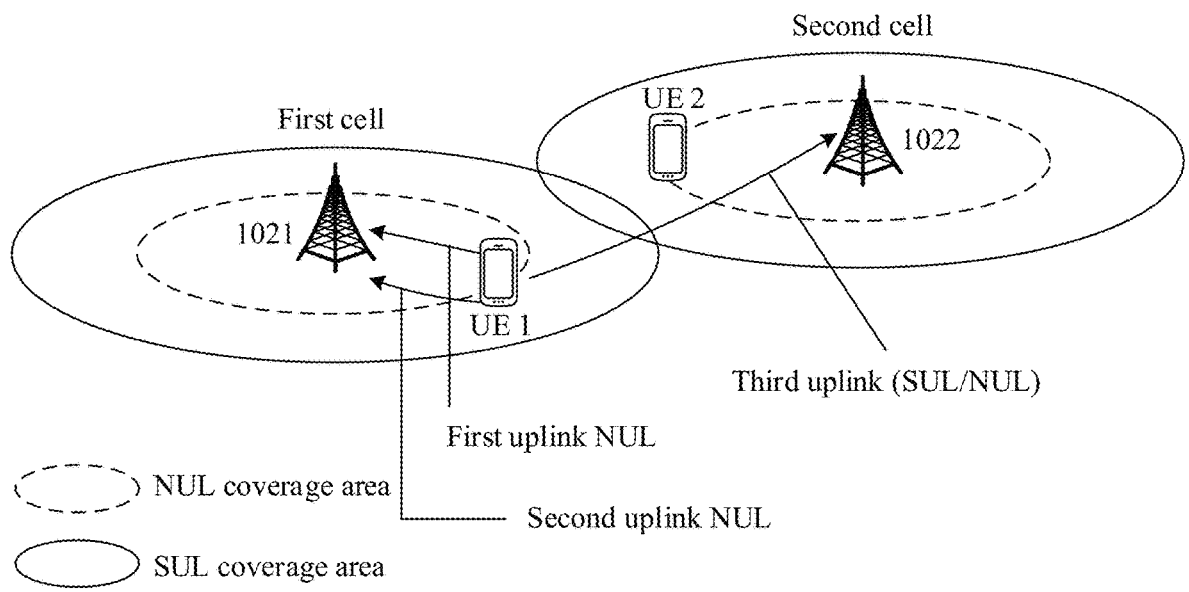
FIG. 2B is a schematic diagram of a random access system to which an embodiment of this application is applicable.

FIG. 2B is a schematic diagram of a random access system. The random access system includes a terminal device UE 1 located in a first cell, a first network device 1021 located in the first cell, and a second network device 1022 located in a second cell. The first cell and the second cell are neighboring cells. A first uplink NUL and a second uplink SUL that are used for random access are configured between the terminal device UE 1 and the first network device 1021. A third uplink used for random access is configured between the terminal device UE 1 and the second network device 1022, and the third uplink may be an NUL or an SUL. To perform random access, the terminal device UE 1 may first select an uplink of the current cell to perform random access. Specifically, the terminal device UE 1 may first select the first uplink NUL to perform random access, and then select the second uplink SUL to perform random access when random access performed by using the first uplink NUL fails. After random access performed by using the uplink of the current cell fails, the terminal device UE 1 may select an uplink of a neighboring cell to perform random access. Specifically, the terminal device UE 1 may select the third uplink between the terminal device UE 1 and the second network device 1022 located in the second cell to perform random access.

To perform random access, a terminal device UE 2 located in the second cell may use a method similar to that used by the UE 1. The terminal device UE 2 first selects an uplink of the current cell (the second cell) to perform random access, and then selects an uplink of a neighboring cell (the first cell) to perform random access when random access performed by using the uplink of the current cell fails.

Figure 3:
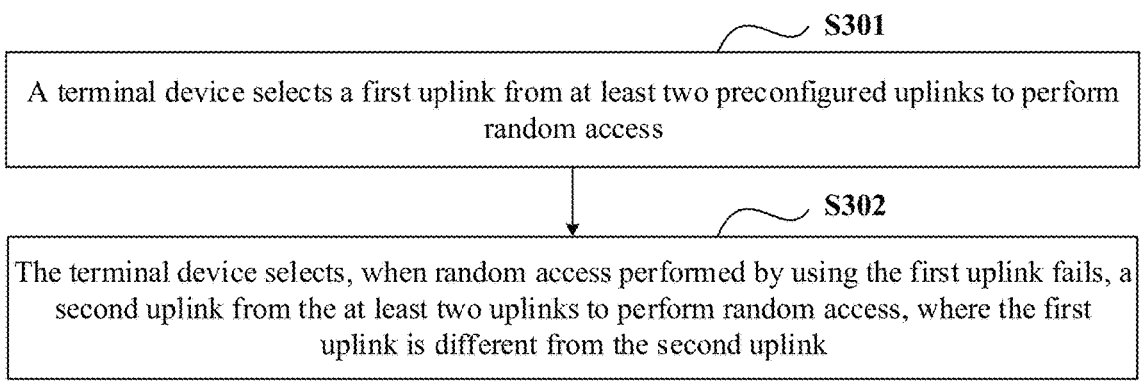
FIG. 3 is a schematic diagram of a random access process according to an embodiment of this application.

FIG. 3 is a flowchart of a random access method. In the flowchart, a terminal device may be the terminal device 101 shown in FIG. 1, and a network device may be the network device 102 shown in FIG. 1. It may be understood that in this application, a function of the network device may alternatively be implemented by using a chip applied to the network device, and a function of the terminal device may alternatively be implemented by using a chip applied to the terminal device. The procedure is specifically as follows:

S301. The terminal device selects a first uplink from at least two preconfigured uplinks to perform random access.

At least two uplinks are configured between the terminal device and the network device. To perform random access, the terminal device may select an uplink from the at least two uplinks to perform random access. The selected uplink may be referred to as the first uplink.

In an example, the terminal device may randomly select an uplink from the at least two uplinks to perform random access. The randomly selected uplink may be referred to as the first uplink.

In another example, the at least two uplinks preconfigured for the terminal device may include an SUL and an NUL. The terminal device may measure downlink RSRP, and compare the downlink RSRP with a first threshold. If the downlink RSRP is less than the first threshold, the terminal device may select the SUL to perform random access. In this case, the SUL may be the first uplink. If the downlink reference signal received power is greater than or equal to the first threshold, the terminal device may select the NUL to perform random access. In this case, the NUL may be referred to as the first uplink. The downlink RSRP may be a demodulation reference signal, a channel state measurement signal, or the like.

S302. The terminal device selects, when random access performed by using the first uplink fails, a second uplink from the at least two uplinks to perform random access, where the first uplink is different from the second uplink.

Specifically, the terminal device may prestore a condition under which random access performed by the terminal device by using the first uplink fails. When at least one of the following conditions is met, it may be determined that random access performed by the terminal device by using the first uplink fails. When none of the following conditions is met, it may be determined that the terminal device can continue to perform random access by using the first uplink. The condition under which random access fails may specifically include a condition 1, a condition 2, or a condition 3.

In the condition 1, a quantity of consecutive failures of random access performed by the terminal device by using the first uplink reaches N1, where N1 is a positive integer greater than or equal to 1. In other words, when the terminal device selects the first uplink to perform random access, if the terminal device determines that the current quantity of consecutive failures of random access performed by using the first uplink reaches N1, the terminal device can no longer perform random access by using the first uplink, and then may select the second uplink to perform random access.

In the condition 2, a quantity of times of reporting a random access problem reaches L1 because random access performed by the terminal device by using the first uplink fails, where L1 is a positive integer greater than or equal to 1. In other words, when the terminal device selects the first uplink to perform random access, if the terminal device determines that the current quantity of times of reporting the random access problem reaches L1 because random access performed by using the first uplink fails, the terminal device can no longer perform random access by using the first uplink, and then may select the second uplink to perform random access.

In the condition 3, a first timer of the first uplink is activated. That a first timer is activated means that a quantity of consecutive failures of random access performed by the terminal device by using the first uplink reaches a first value, or a quantity of times of reporting a random access problem reaches a second value because random access performed by the terminal device by using the first uplink fails. In other words, when the terminal device selects the first uplink to perform random access, if the terminal device determines that the first timer corresponding to the first uplink is currently activated, the terminal device can no longer perform random access by using the first uplink, and then selects the second uplink to perform random access.

If the terminal device determines that random access performed by using the first uplink fails, the terminal device may select another uplink from the at least two uplinks to perform random access. The selected another uplink may be referred to as the second uplink, and the first uplink is different from the second uplink.

In an implementation, the first uplink may be a communications link between the terminal device and a first network device, the second uplink may be a communications link between the terminal device and a second network device, and the first network device is different from the second network device. In addition, the first network device and the terminal device may be located in a same cell. The second network device and the terminal device are located in different cells. This may be understood as that the second network device and the terminal device are located in neighboring cells. The first uplink may be an NUL between the terminal device and the first network device, and the second uplink may be an NUL between the terminal device and the second network device.

For example, a cell in which the terminal device and the first network device are located is referred to as a first cell, and a cell in which the second network device is located is referred to as a second cell. The first cell and the second cell may be neighboring cells, or may not be neighboring cells. The terminal device may select the first uplink, namely, the NUL, of the first cell to perform random access. If the first uplink of the first cell meets the condition under which random access fails (which indicates that the terminal device is forbidden to access the first cell within a time period), the terminal device may attempt to perform random access by using the second uplink of the second cell.

In another implementation, the at least two uplinks may include three uplinks: the first uplink, the second uplink, and a third uplink. The first uplink and the second uplink may be communications links between the terminal device and a first network device. For example, the first uplink may be an NUL, and the second uplink may be an SUL. The third uplink may be a communications link between the terminal device and a second network device.

When random access performed by the terminal device by using the first uplink fails, the terminal device selects the second uplink to perform random access. The terminal device may prestore a condition under which random access performed by the terminal device by using the second uplink fails. When at least one of conditions under which random access performed by using the second uplink fails is met, it may be determined that random access performed by the terminal device by using the second uplink fails. When none of the conditions under which random access performed by using the second uplink fails is met, it may be determined that the terminal device can continue to perform random access by using the second uplink. If the terminal device determines that random access performed by using the second uplink fails, the terminal device may select the third uplink to perform random access. If random access performed by the terminal device by using the third uplink succeeds, the terminal device ends a random access process.

At least two uplinks are configured between the terminal device and the first network device. The first uplink is a normal uplink NUL, and the second uplink is a supplementary uplink SUL. In addition, there may be one or more first uplinks. When there are a plurality of first uplinks, the terminal device may preconfigure a priority of each first uplink. When selecting the first uplink to perform random access, the terminal device may select each first uplink based on the priority of each first uplink to perform random access. If random access performed by the terminal device by using any one of the first uplinks succeeds, the terminal device ends the random access process. When random access performed by using each of the first uplinks fails, the terminal device may select the second uplink to perform random access.

There may be one or more second uplinks. When there are a plurality of second uplinks, the terminal device may preconfigure a priority of each second uplink. When determining that random access performed by using the first uplink fails, the terminal device may select each second uplink based on the priority of each second uplink to perform random access. If random access performed by the terminal device by using any one of the second uplinks succeeds, the terminal device ends the random access process. When random access performed by using each of the second uplinks fails, the terminal device may select the third uplink to perform random access. The third uplink may be an NUL or an SUL.

The terminal device may store the condition under which random access performed by using the second uplink fails. The condition may be any one of the following conditions: a condition 1, a condition 2, and a condition 3.

In the condition 1, a quantity of consecutive failures of random access performed by the terminal device by using the second uplink reaches N2, where N2 is a positive integer greater than or equal to 1. In other words, when the terminal device selects the second uplink to perform random access, if the terminal device determines that the current quantity of consecutive failures of random access performed by using the second uplink reaches N2, the terminal device can no longer perform random access by using the second uplink, and then may select the third uplink to perform random access.

In the condition 2, a quantity of times of reporting a random access problem reaches L2 because random access performed by the terminal device by using the second uplink fails, where L2 is a positive integer greater than or equal to 1. In other words, when the terminal device selects the second uplink to perform random access, if the terminal device determines that the current quantity of times of reporting the random access problem reaches L2 because random access performed by using the second uplink fails, the terminal device can no longer perform random access by using the second uplink, and then selects the third uplink to perform random access.

In the condition 3, a second timer of the second uplink is activated. That a second timer is activated means that a quantity of consecutive failures of random access performed by the terminal device by using the second uplink reaches a third value, or a quantity of times of reporting a random access problem reaches a fourth value because random access performed by the terminal device by using the second uplink fails. In other words, when the terminal device selects the second uplink to perform random access, if the terminal device determines that the second timer corresponding to the second uplink is currently activated, the terminal device can no longer perform random access by using the second uplink, and then selects the third uplink to perform random access.

For the procedure shown in FIG. 3, the following describes in detail implementation of the procedure shown in FIG. 3 by using an example in which "the first uplink is selected based on a relationship between a downlink reference signal and a first threshold".

Before performing random access, the terminal device may receive configuration information sent by the network device. The configuration information is used to configure the first threshold. For example, the configuration information may include a supplementary uplink SUL configuration parameter. For example, the configuration information further includes a random access configuration parameter.

The terminal device may select an uplink from the at least two preconfigured uplinks to perform random access by using downlink reference signal received power and the preconfigured first threshold. For example, the terminal device measures the downlink reference signal received power, and determines a value relationship between the downlink reference signal received power and the first threshold. When the downlink reference signal received power is greater than or equal to the first threshold, the terminal device selects the first uplink to perform random access. When the downlink reference information received power is less than the first threshold, the terminal device selects the second uplink to perform random access.

It should be noted that according to a current standard protocol, an NR network may have a plurality of architectures, to adapt to policies of different operators for evolution from an LTE network to the NR network, for example, Option 3/7 and a derived architecture thereof, such as Option 3X/3a/7X/7a, in a non-standalone (non-standalone, NSA) architecture. In these architectures, the terminal device needs to first access the LTE network, uses a cell in which an LTE network device is located as a primary cell (primary cell, PCell), obtains, by using signaling of the LTE network, necessary information for accessing the NR network, for example, a random access configuration parameter and a supplementary uplink configuration parameter, and then accesses the NR network based on the necessary information. Herein, a cell in which an NR network device is located may be considered as a secondary sell (secondary sell, SCell).

For another example, in a standalone (standalone, SA) architecture, an NR network and an LTE network of an operator are independently deployed. Therefore, the terminal device may directly access the NR network without assistance of the LTE network.

For another example, in Option 4 and a derived architecture thereof, such as Option 4a, in an NSA architecture, the terminal device needs to first access the NR network, uses a cell in which an NR network device is located as a primary cell PCell, obtains, by using signaling of the NR network, necessary information for accessing the LTE network, and then accesses the LTE network. Herein, a cell in which the LTE network is located may be considered as a secondary cell (SCell).

In conclusion, when the terminal device receives configuration information sent by the first network device or a third network device, and the configuration information is used to configure the first threshold, if the first network device is an NR network device, the third network device is an LTE network device, and the first threshold is configured by the NR network device, a cell in which the NR network device is located is a primary cell of the terminal device, and a cell in which the LTE network device is located is a secondary cell of the terminal device. On the contrary, if the first threshold is configured by the LTE network device, a cell in which the LTE network device is located is a primary cell of the terminal device, and a cell in which the NR network device is located is a secondary cell of the terminal device.

Before the terminal device performs random access, the first network device or the third network device configures a random access configuration parameter and a supplementary uplink SUL configuration parameter for the terminal device. To perform random access, information sent by the terminal device to the first network device includes at least a random access preamble, and the random access preamble carries preamble sequence identification information to notify the first network device that the terminal device expects to perform random access. The random access configuration parameter configured by the first network device or the third network device for the terminal device may include a basic parameter required by the terminal device to initiate random access to the first network device, for example, a preamble set, a maximum quantity of preamble retransmissions, and a preamble power boost order.

The supplementary uplink SUL-related parameter may include the first threshold sul-RSRP-Threshold used by the terminal device to determine whether to select the first uplink NUL of the first network device or the second uplink SUL of the first network device to perform random access. If the terminal device receives the supplementary uplink SUL-related parameter, it indicates that the first network device supports using the first uplink NUL and the second uplink SUL as uplinks.

It should be noted that when the network device sends the configuration information to the terminal device, the configuration information may be carried in semi-static signaling or dynamic signaling, for example, a master information block (master information block, MIB) of system information, a system information block (system information block, SIB), remaining minimum system information (remaining minimum system information, RMSI), other system information (other system information, OSI), media access control (Media Access Control, MAC) control element (Control Element, CE) signaling, radio resource control (Radio Resource Control, RRC) signaling, or a physical control message such as L1 signaling, downlink control information (Downlink Control Information, DCI), or group common DCI.

In addition, the random access configuration parameter and the supplementary uplink configuration parameter that are carried in the configuration information may be carried in same signaling or different signaling. This is not limited herein.

In an implementation, if the operator uses the SA architecture or Option 4 or a derived architecture thereof in the NSA architecture, the first network device located in the same cell as the terminal device sends the configuration information to the terminal device. The configuration information may be carried in RMSI or OSI.

In another implementation, if the operator uses Option 3/7 or a derived architecture thereof, such as Option 3X/3a/7X/7a, in the non-standalone (non-standalone, NSA) architecture, the terminal device needs to first access the third network device (namely, LTE device) to obtain the configuration information, uses the cell in which the third network device is located as the primary cell PCell, and then accesses the first network device in the first cell based on the obtained configuration information, and uses the cell in which the first network device is located as the secondary cell SCell. When the third network device sends the configuration information to the terminal device, the configuration information may be carried in a SIB or a MIB.

In an embodiment of this application, the terminal device maintains two timers for the first network device that attempts to perform random access, for example, the first timer NUL bar timer used for the first uplink of the first network device and the second timer SUL bar timer used for the second uplink of the second network device. Timing duration of the first timer is first duration, and timing duration of the second timer is second duration. When the first timer NUL bar timer is activated, the terminal device is forbidden to perform random access by using the first uplink of the first network device within the first duration. When the second timer SUL bar timer is activated, the terminal device is forbidden to perform random access by using the second uplink of the first network device within the second duration. It should be noted that the first duration may be 180 s, or the first duration may be another value. This is not limited herein. The second duration may be 180 s, or the second duration may be another value. The first duration may be the same as or different from the second duration. This is not limited herein.

For example, a condition for activating the first timer may be that the quantity of consecutive failures of random access performed by the terminal device by using the first uplink of the first network device reaches the first value. The first value is an integer greater than or equal to 1. For example, the first value may be M1*maximum quantity of preamble retransmissions, where M1 is a positive integer. For example, a value of M1 may be 1 or 2. Alternatively, the first value may be a value obtained through counting by a preamble transmission counter (preamble transmission counter). More specifically, the first value may be obtained by increasing the value obtained by the preamble retransmission counter by 1 each time the maximum quantity of preamble retransmissions is reached, for example, preambleTxMax+1.

For example, a condition for activating the first timer may alternatively be that the quantity of times of reporting the random access problem reaches the second value because random access performed by the terminal device by using the first uplink of the first network device fails. The second value is a positive integer. For example, the second value may be 1 or 2. The first value may be the same as or different from the second value.

For example, a condition for activating the second timer may be that the quantity of consecutive failures of random access performed by the terminal device by using the second uplink of the first network device reaches the third value. The third value is an integer greater than or equal to 1. For example, the third value may be M2*maximum quantity of preamble retransmissions, where M2 is a positive integer. For example, a value of M2 may be 1 or 2. Alternatively, the third value may be a value obtained through counting by the preamble transmission counter (preamble transmission counter). More specifically, the third value may be obtained by increasing the value obtained by the preamble retransmission counter by 1 each time the maximum quantity of preamble retransmissions is reached, for example, preambleTxMax+1.

For example, a condition for activating the second timer may alternatively be that the quantity of times of reporting the random access problem reaches the fourth value because random access performed by the terminal device by using the second uplink of the first network device fails. The fourth value is a positive integer. For example, the fourth value may be 1 or 2. The third value may be the same as or different from the fourth value.

Figure 4A:
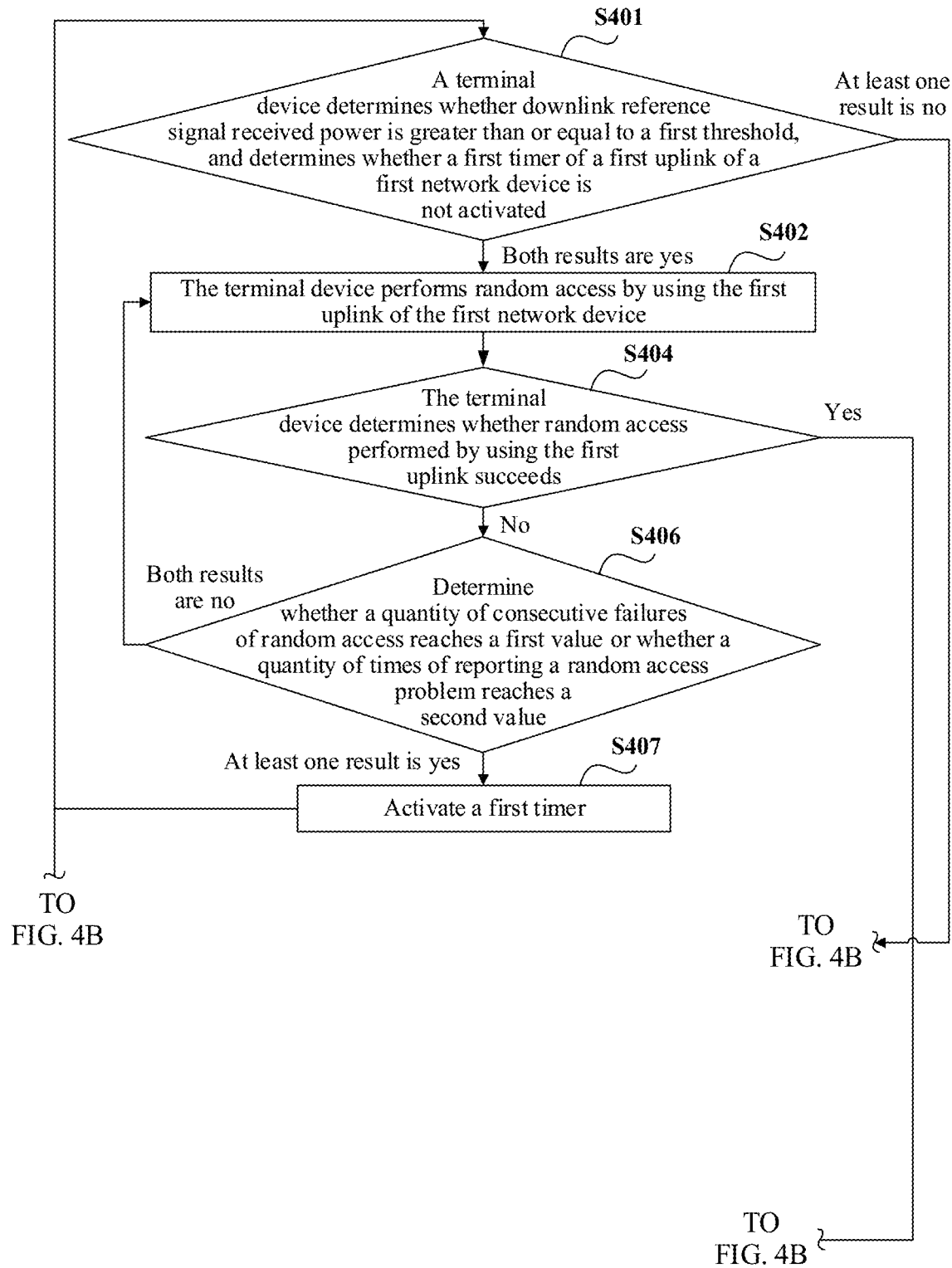
FIG. 4A and FIG. 4B are a schematic diagram of a random access process according to an embodiment of this application.
Figure 4B:
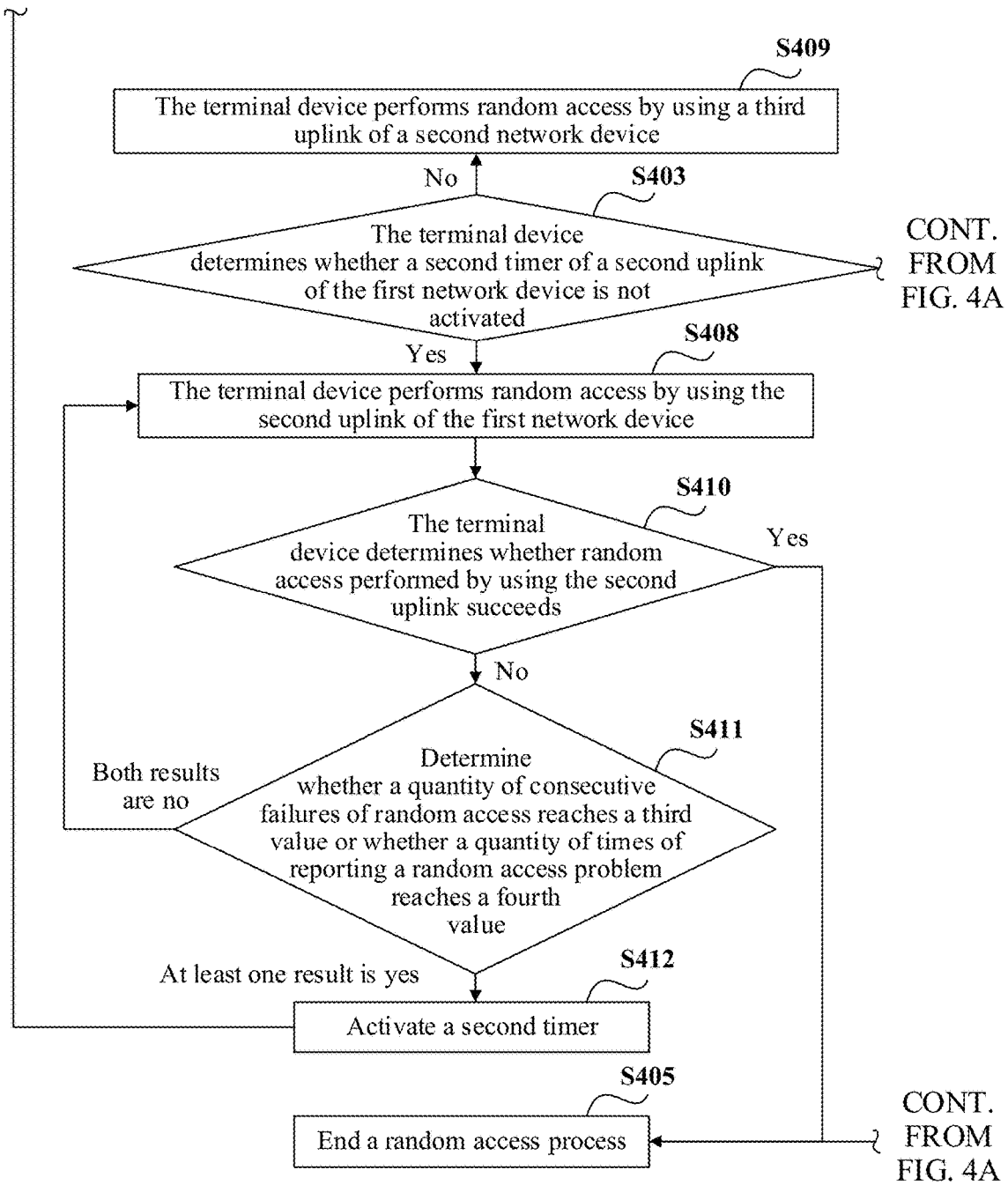

FIG. 4A and FIG. 4B are a schematic diagram of a random access process according to an embodiment of this application. The random access process includes the following steps.

S401. A terminal device determines whether a value of downlink reference signal received power is greater than or equal to a first threshold, and determines whether a first timer of a first uplink of a first network device is not activated, and performs S402 if the value of the downlink reference signal received power is greater than or equal to the first threshold, and the first timer is not activated, or performs S403 if the value of the downlink reference signal received power is not greater than or equal to the first threshold, or the first timer is activated, or the value of the downlink reference signal received power is not greater than or equal to the first threshold, and the first timer is activated.

S402. The terminal device performs random access by using the first uplink of the first network device.

S404. The terminal device determines whether random access performed by using the first uplink succeeds, and performs S405 if random access succeeds, or performs S406 if random access fails.

S405. End a random access process.

S406. Determine whether a quantity of consecutive failures of random access reaches a first value or whether a quantity of times of reporting a random access problem reaches a second value, and perform S407 if the quantity of consecutive failures of random access reaches the first value, or the quantity of times of reporting the random access problem reaches the second value, or the quantity of consecutive failures of random access reaches the first value, and the quantity of times of reporting the random access problem reaches the second value, or perform S402 if the quantity of consecutive failures of random access does not reach the first value, and the quantity of times of reporting the random access problem does not reach the second value.

S407. Activate the first timer, and perform S401.

S403. The terminal device determines whether a second timer of a second uplink of the first network device is not activated, and performs S408 if the second timer is not activated, or performs S409 if the second timer is activated.

S408. The terminal device performs random access by using the second uplink of the first network device.

S409. The terminal device performs random access by using a third uplink of a second network device.

S410. The terminal device determines whether random access performed by using the second uplink succeeds, and performs S405 if random access succeeds, or performs S411 if random access fails.

S411. Determine whether a quantity of consecutive failures of random access reaches a third value or whether a quantity of times of reporting a random access problem reaches a fourth value, and perform S412 if the quantity of consecutive failures of random access reaches the third value, or the quantity of times of reporting the random access problem reaches the fourth value, or the quantity of consecutive failures of random access reaches the third value, and the quantity of times of reporting the random access problem reaches the fourth value, or perform S408 if the quantity of consecutive failures of random access does not reach the third value, and the quantity of times of reporting the random access problem does not reach the fourth value.

S412. Activate the second timer, and perform S401.

After performing S412 of activating the second timer, the terminal device needs to perform random access in this case. Both the first timer and the second timer are activated. Therefore, the terminal device may directly perform random access by using the third uplink of the second network device. In other words, S409 may be performed after S412 is performed.

When the terminal device determines that the value of the downlink reference signal received power is greater than or equal to the first threshold, and the first timer is not activated in S401, it indicates that the terminal device is not forbidden to perform random access by using the first uplink of the first network device in a first cell in this case, and the DL RSRP measured by the terminal device meets the first threshold for performing random access by using the first uplink. Therefore, the terminal device performs S402, in other words, the terminal device attempts to perform random access by using the first uplink of the first network device in the first cell. Herein, random access that the terminal device attempts to perform by using the first uplink of the first network device in the first cell may be initial random access, or may be new random access that the terminal device attempts to perform. This is not limited.

After S402, the terminal device performs S404 of determining whether random access succeeds. If random access succeeds, the terminal device performs S405 of ending the random access process. When random access fails, the terminal device usually may attempt to perform new random access.

When the terminal device determines that random access fails in S404, the terminal device performs S406 of determining whether the quantity of consecutive failures of random access performed by using the first uplink reaches the first value or whether the quantity of times of reporting the random access problem reaches the second value. If the quantity of consecutive failures of random access reaches the first value, or the quantity of times of reporting the random access problem reaches the second value, or the quantity of consecutive failures of random access reaches the first value, and the quantity of times of reporting the random access problem reaches the second value, the terminal device performs S407. If the quantity of consecutive failures of random access does not reach the first value, and the quantity of times of reporting the random access problem does not reach the second value, the terminal device performs S402. Herein, both the first value and the second value are positive integers.

In an embodiment, S406 is performed, so that the terminal device determines whether to activate the first timer used for the first uplink or continue to attempt to perform random access by using the first uplink of the first network device. When the first timer used for the first uplink does not meet an activation condition, the terminal device subsequently performs S402 of continuing to perform random access by using the first uplink of the first network device. When the first timer used for the first uplink meets the activation condition, the terminal device activates the first timer, and then continues to perform S401.

When the terminal device determines that the value of the downlink reference signal received power is not greater than or equal to the first threshold, and the first timer is activated in S401, it indicates that the terminal device is forbidden to perform random access by using the first uplink of the first network device in a first cell in this case, or the DL RSRP measured by the terminal device does not meet the first threshold for performing random access by using the first uplink. Therefore, the terminal device performs S408, in other words, the terminal device attempts to perform random access by using the second uplink of the first network device in the first cell. Herein, random access that the terminal device attempts to perform by using the second uplink of the first network device in the first cell may be initial random access, or may be new random access that the terminal device attempts to perform. This is not limited.

After S408, the terminal device performs S410 of determining whether random access succeeds. If random access succeeds, the terminal device performs S405 of ending the random access process. When random access fails, the terminal device usually may attempt to perform new random access.

When the terminal device determines that random access fails in S410, the terminal device performs S411 of determining whether the quantity of consecutive failures of random access performed by using the second uplink reaches the third value or whether the quantity of times of reporting the random access problem reaches the fourth value. If the quantity of consecutive failures of random access reaches the third value, or the quantity of times of reporting the random access problem reaches the fourth value, or the quantity of consecutive failures of random access reaches the third value, and the quantity of times of reporting the random access problem reaches the fourth value, the terminal device performs S412. If the quantity of consecutive failures of random access does not reach the third value, and the quantity of times of reporting the random access problem does not reach the fourth value, the terminal device performs S408. Herein, both the third value and the fourth value are positive integers.

In an embodiment, S411 is performed, so that the terminal device determines whether to activate the second timer used for the second uplink or continue to attempt to perform random access by using the second uplink of the first network device. When the second timer used for the second uplink does not meet an activation condition, the terminal device subsequently performs S408 of continuing to perform random access by using the second uplink of the first network device. When the second timer used for the second uplink meets the activation condition, the terminal device activates the second timer, and then continues to perform S401.

When the terminal device determines that the second timer is not activated in S401, the terminal device performs step 130 of attempting to perform random access by using the second uplink of the first network device in the first cell. When the terminal device determines that the second timer is not activated, it indicates that the terminal device is not forbidden to perform random access by using the second uplink of the first network device in the first cell in this case, but the terminal device cannot perform random access by using the first uplink of the first network device in the first cell in this case.

In an example, when the DL RSRP measured by the terminal device is greater than or equal to the first threshold, according to a standard, the terminal device may perform random access by using the first uplink of the first network device in the first cell. In this case, the first timer used for the first cell is activated, in other words, the terminal device recently experiences consecutive random access failures on the first uplink of the first network device in the first cell. Therefore, in this case, even though the DL RSRP is greater than or equal to the first threshold, the terminal device may perform random access by using the second uplink of the first network device in the first cell, to increase a random access success rate.

In another example, when the DL RSRP measured by the terminal device is less than the first threshold, according to a standard, the terminal device may perform random access by using the second uplink of the first network device in the first cell.

In addition, random access that the terminal device attempts to perform by using the second uplink of the first network device may be initial random access, or may be new random access that the terminal device attempts to perform. This is not limited herein.

When determining that the second timer used for the second uplink is activated in S403, the terminal device performs S409, in other words, the terminal device attempts to perform random access by using the third uplink of the second network device.

Specifically, although the DL RSRP measured by the terminal device is greater than or equal to the first threshold, when both the first timer used for the first uplink and the second timer used for the second uplink are activated, or although the DL RSRP measured by the terminal device is less than the first threshold, when the second timer used for the second uplink is activated, the terminal device may attempt to perform random access by using a network device in another cell. Herein, the network device in the another cell may include at least the second network device. The second network device may be an NR network device or an LTE network device. A cell in which the second network device is located is a neighboring cell of a cell in which the terminal device is located. The terminal device may directly attempt to access an NR network device. Alternatively, the terminal device may first access an LTE network device, and then access an NR network device based on configuration information obtained from the LTE network device. Alternatively, the terminal device may access an NR network device in another manner. This is not limited. A specific manner in which the terminal device accesses the NR network device may be determined based on a network architecture of a wireless communications system deployed by an operator.

Figure 5A:
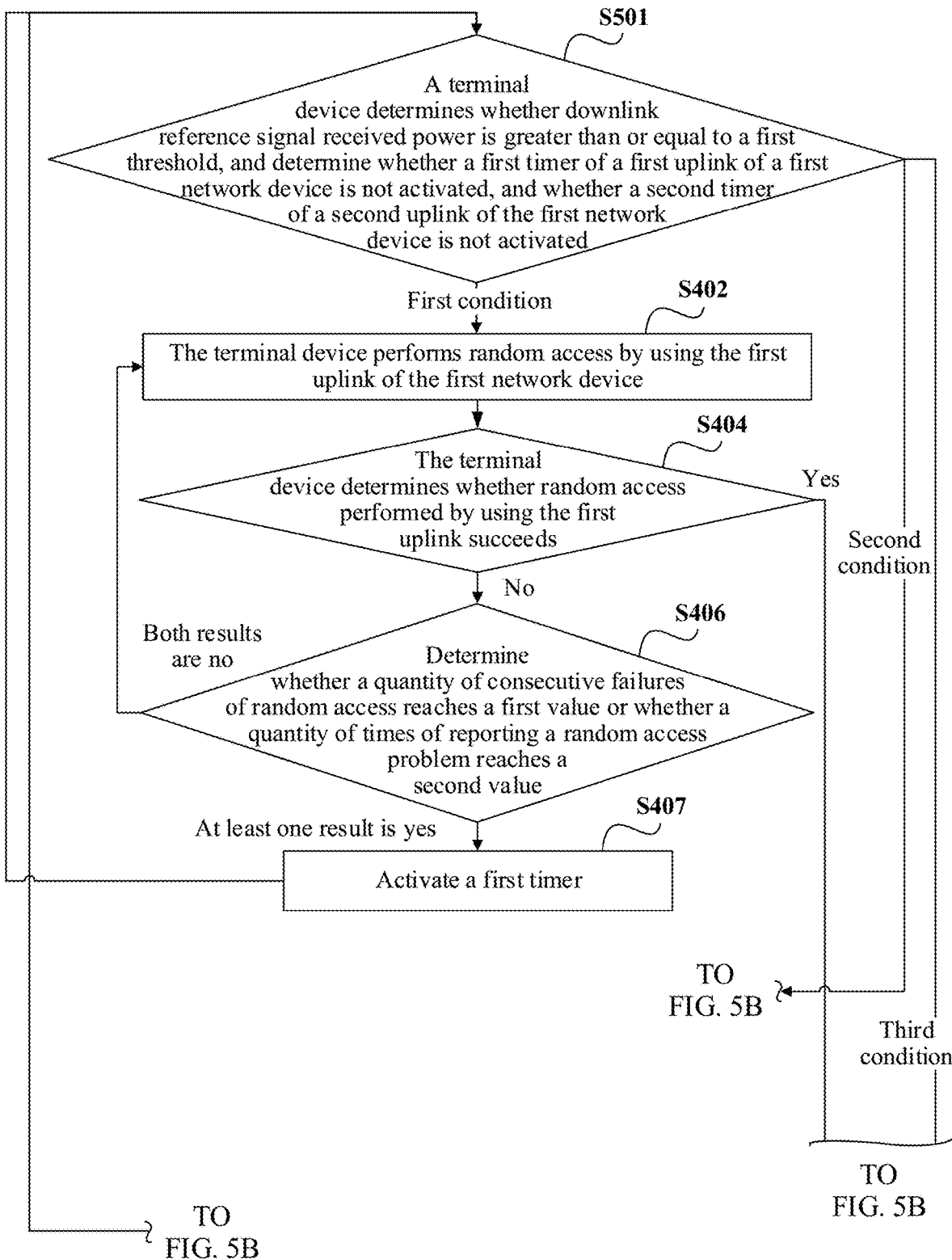
FIG. 5A and FIG. 5B a schematic diagram of a random access process according to an embodiment of this application.
Figure 5B:
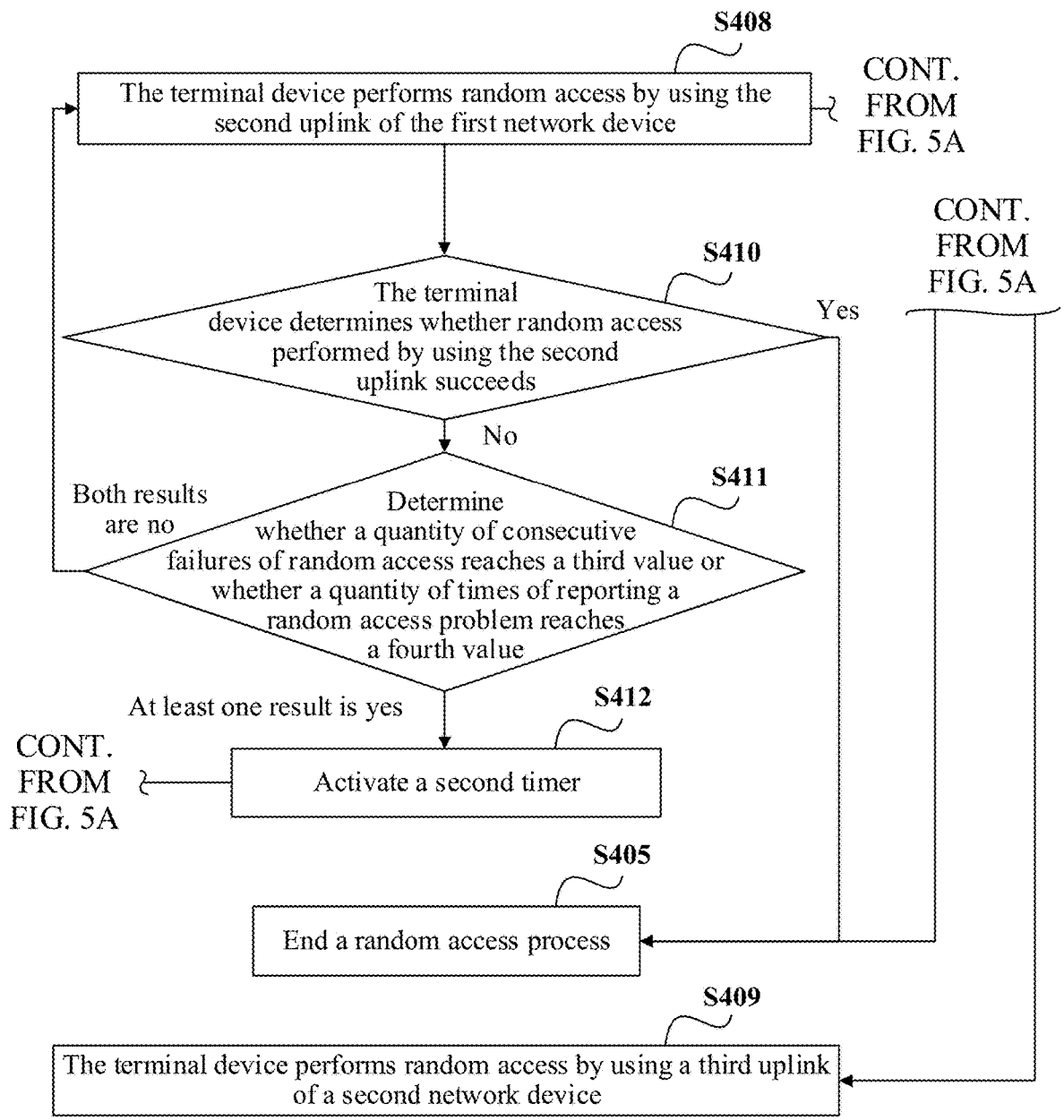

In a possible implementation, S401 and S403 in FIG. 4A may be combined into step S501 in FIG. 5A.

As shown in FIG. 5A, S501 is as follows: A terminal device determines whether a value of downlink reference signal received power is greater than or equal to a first threshold, and determines whether a first timer of a first uplink of a first network device is not activated, and whether a second timer of a second uplink of the first network device is not activated. When a determining result meets a first condition: the value of the downlink reference signal received power is greater than or equal to the first threshold, and the first timer is not activated, the terminal device performs S402 and subsequent steps corresponding to FIG. 4A and FIG. 4B. Details are not described herein again.

When the determining result meets a second condition: the value of the downlink reference signal received power is less than the first threshold, and the second timer is not activated, or the first timer is activated, and the second timer is not activated, the terminal device performs S408 and subsequent steps corresponding to FIG. 4B. Details are not described herein again.

When the determining result meets a third condition, namely, a case other than the first condition and the second condition, the terminal device performs S409 and subsequent steps corresponding to FIG. 4B. Details are not described herein again.

The second condition may be specifically that both the first timer and the second timer are activated, or the value of the downlink reference signal received power is less than the first threshold, and the second timer is activated.

It should be noted that there may be a parallel implementation relationship or a progressive implementation relationship between the first condition to the third condition involved in the determining condition in step 501, in other words, determining is sequentially performed for the conditions. In this case, a determining sequence of the first condition to the third condition is not limited, and there may be a plurality of possible implementations.

Figure 6:
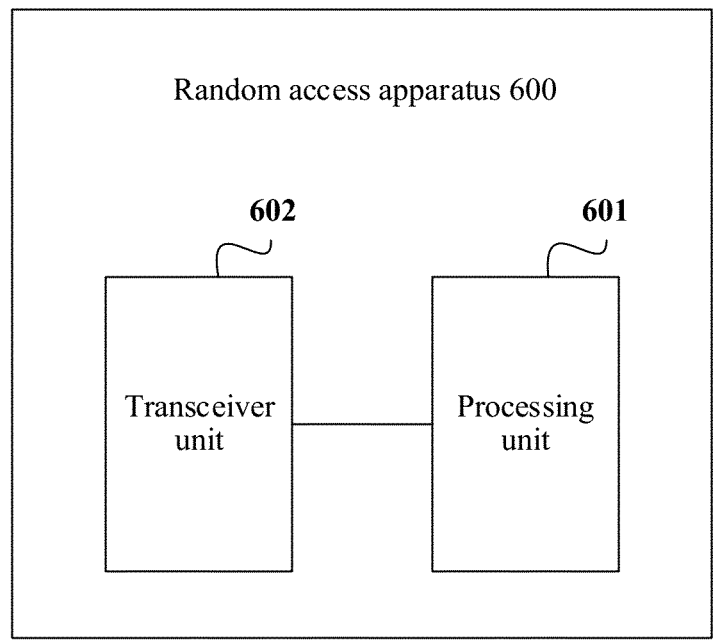
FIG. 6 is a schematic diagram of an apparatus configured to perform random access according to an embodiment of this application.

Based on a same inventive concept as the foregoing random access method, as shown in FIG. 6, an embodiment of this application further provides a random access apparatus 600. The random access apparatus 600 is configured to perform an operation performed by the terminal device in the foregoing random access method. The random access apparatus 600 includes a processing unit 601 and a transceiver unit 602. The transceiver unit 602 is configured to receive and send data. The processing unit 601 is configured to: select a first uplink from at least two preconfigured uplinks, and perform random access based on the selected first uplink by using the transceiver unit 602; and when it is determined that random access performed by using the first uplink fails, select a second uplink from the at least two uplinks, and perform random access based on the selected second uplink by using the transceiver unit 602.

In a possible implementation, the at least two uplinks are communications links between the apparatus and a first network device, the first network device and the apparatus are located in a same cell, and the processing unit 601 is further configured to: when random access performed by using the second uplink fails, select a third uplink, and perform random access based on the selected third uplink by using the transceiver unit 602. The third uplink is a communications link between the terminal device and a second network device, and the second network device is different from the first network device.

In a possible implementation, if at least two first uplinks are preconfigured, when the processing unit 601 selects the first uplink to perform random access, the processing unit 601 may select each first uplink based on a priority of each first uplink to perform random access. In addition, if at least two second uplinks are preconfigured, when the processing unit 601 selects the second uplink to perform random access, the processing unit 601 may select each second uplink based on a priority of each second uplink to perform random access.

In a possible implementation, when it is determined that the following condition is met, the processing unit 601 may determine that random access performed by using the first uplink or the second uplink fails:

condition 1: A quantity of consecutive failures of random access performed by using the first uplink or the second uplink reaches N, where N is a positive integer greater than or equal to 1; or condition 2: A quantity of times of reporting a random access problem reaches L because random access performed by using the first uplink or the second uplink fails, where L is a positive integer greater than or equal to 1; or condition 3: A first timer of the first uplink is activated or a second timer of the second uplink is activated. That a first timer is activated means that a quantity of consecutive failures of random access performed by using the first uplink reaches a first value, or a quantity of times of reporting a random access problem reaches a second value because random access performed by using the first uplink fails, and that a second timer is activated means that a quantity of consecutive failures of random access performed by using the second uplink reaches a third value, or a quantity of times of reporting a random access problem reaches a fourth value because random access performed by using the second uplink fails.

The processing unit 601 may specifically measure downlink reference signal received power, and determine to select the first uplink to perform random access when the downlink reference signal received power is greater than or equal to a first threshold.

In a possible implementation, the transceiver unit 602 is further configured to receive configuration information sent by the first network device or a third network device. The configuration information is used to configure the first threshold, and the first network device is different from the third network device. The first network device may be an NR network device, and the third network device may be an LTE network device.

Any random access apparatus provided in the foregoing embodiments of this application may be a chip. In other words, the embodiments of this application also protect a chip product that can implement a function of the foregoing apparatus.

Figure 7:
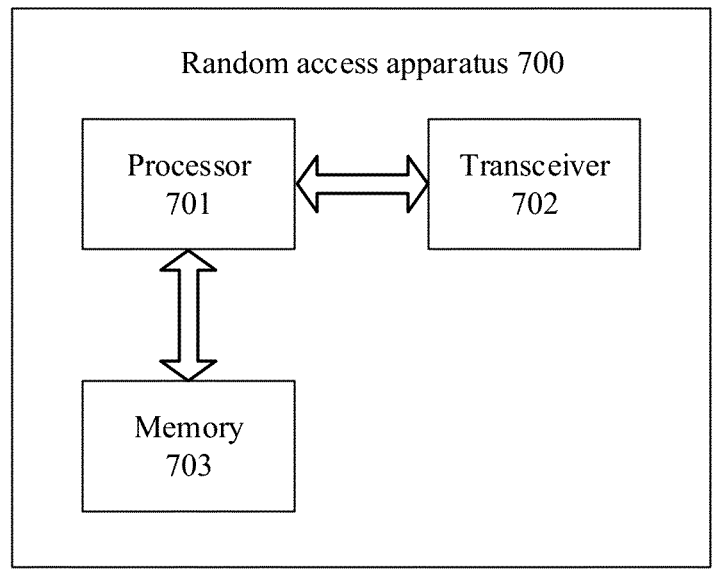
FIG. 7 is a schematic diagram of an apparatus configured to perform random access according to an embodiment of this application.

Based on a same inventive concept as the foregoing random access method, as shown in FIG. 7, an embodiment of this application further provides a random access apparatus 700. The random access apparatus 700 is configured to perform an operation performed by the terminal device in the foregoing random access method. The random access apparatus 700 includes a processor 701, a transceiver 702, and a memory 703. The memory 703 is configured to store a computer program. The processor 701 is configured to invoke and execute the computer program stored in the memory, to perform the operation performed by the terminal device in the foregoing random access method. The transceiver 702 is configured to perform, under control of the processor 701, a wireless data receiving/sending operation with a network device in a process in which the processor 701 performs the foregoing random access method. In FIG. 6, the processing unit 601 may be implemented by the processor 701, and the transceiver unit 602 may be implemented by the transceiver 702.

The embodiments provided in this application may further include any one of the following embodiments (there is no clear correspondence between numbers of the embodiments provided in this part and numbers of the foregoing embodiments, and this is merely for ease of description in this part):

Embodiment 1. A random access method in an uplink and downlink decoupling scenario, applied to user equipment, where the method includes:

receiving, by the user equipment, configuration information sent by a first network device and/or a second network device, where the configuration information includes at least a random access configuration parameter and a supplementary uplink configuration parameter, the first network device is located in a first cell, the second network device is located in a second cell, the supplementary uplink configuration parameter includes a first threshold, the first threshold is used by the user equipment to select a first uplink or a second uplink of the first network device in the first cell to perform random access, and the first network device is a network device that can provide an uplink and downlink decoupling function for the user equipment, where a first timer used for the first cell and a second timer used for the first cell are configured for the user equipment;

the user equipment is forbidden to perform random access by using the first uplink of the first network device in the first cell within first duration when the first timer used for the first cell is activated, where duration of the first timer is the first duration; and the user equipment is forbidden to perform random access by using the second uplink of the first network device in the first cell within second duration when the second timer used for the first cell is activated, where duration of the second timer is the second duration.

In an NR SUL (uplink and downlink decoupling) scenario, the UE may access (in other words, perform random access) a base station in a cell (for example, the first network device in the first cell or the second network device in the second cell) by using an NUL (the first uplink) or an SUL (the second uplink). At least two timers may be configured for the user equipment: an NUL bar timer (the first timer used for the first cell) and an SUL bar timer (the second timer used for the first cell). When each of the two timers is activated, the user equipment is forbidden to perform random access by using an NUL or an SUL of a corresponding base station within a time period, to avoid a latency and an energy loss caused by excessive failed random access attempts made by the user equipment on an uplink of a cell. If only one timer is configured, the UE may activate the timer after consecutive access failures are encountered by using the NUL or the SUL. In this case, a case in which the UE cannot select the another uplink to perform random access, but actually the another uplink is available may occur. Consequently, the UE may be forced to attempt to access a base station in another cell that is relatively far away from the UE, resulting in a reduction in a random access success rate or extra energy consumption and time consumption.

Embodiment 2. The method according to Embodiment 1, further including:

when the first timer used for the first cell is not activated, and downlink reference signal received power measured by the user equipment is greater than or equal to the first threshold, performing, by the user equipment, random access by using the first uplink of the first network device in the first cell.

It is merely specified in a standard that a condition under which the UE selects the NUL of the current cell to perform random access is that the DL RSRP (downlink reference signal received power) measured by the UE is not less than the first threshold (the parameter is sul-RSRP-Threshold in the standard), and the NUL bar timer used for the current cell is not activated (in other words, the NUL of the current cell can be accessed).

Usually, when the DL RSRP measured by the UE is less than the first threshold, it indicates that the UE is relatively far away from a base station or channel quality is slightly poor. When the DL RSRP measured by the UE is greater than or equal to the first threshold, it indicates that the UE is relatively close to the base station or the channel quality is relatively good.

Embodiment 3. The method according to Embodiment 1 or Embodiment 2, where that the user equipment is forbidden to perform random access by using the first uplink of the first network device in the first cell within first duration when the first timer used for the first cell is activated includes:

when the first timer used for the first cell is activated, and the second timer used for the first cell is not activated, performing, by the user equipment, random access by using the second uplink of the first network device in the first cell.

A condition under which the UE selects the SUL of the current cell to perform random access is that the NUL bar timer used for the current cell is activated (in other words, the NUL of the current cell cannot be accessed), and the SUL bar timer used for the current cell is not activated (in other words, the SUL of the current cell can be accessed). In this case, a relationship between the DL RSRP and the first threshold may not be considered.

Embodiment 4. The method according to any one of Embodiments 1 to 3, further including:

when the first timer used for the first cell is not activated, the downlink reference signal received power measured by the user equipment is less than the first threshold, and the second timer used for the first cell is not activated, performing, by the user equipment, random access by using the second uplink of the first network device in the first cell.

Another condition under which the UE selects the SUL of the current cell to perform random access is that the NUL bar timer used for the current cell is not activated (in other words, the NUL of the current cell can be accessed), the SUL bar timer used for the current cell is not activated (in other words, the SUL of the current cell can be accessed), and as specified in the standard, the DL RSRP measured by the UE is less than the first threshold (sul-RSRP-Threshold), in other words, the UE may be relatively far away from the base station.

Embodiment 5. The method according to any one of Embodiments 1 to 4, further including:

when the first timer used for the first cell is activated, and the second timer used for the first cell is activated, performing, by the user equipment, random access by using a third network device and/or a fourth network device, where the third network device and/or the fourth network device do/does not belong to the first cell.

A condition under which the UE selects another cell (a neighboring cell other than the current cell) to perform random access is that the NUL bar timer used for the current cell is activated (the NUL of the current cell cannot be accessed) and the SUL bar timer used for the current cell is activated (the SUL of the current cell cannot be accessed).

Embodiment 6. The method according to any one of Embodiments 1 to 5, further including:

when the first timer used for the first cell is not activated, the downlink reference signal received power measured by the user equipment is less than the first threshold, and the second timer used for the first cell is activated, performing, by the user equipment, random access by using the third network device and/or the fourth network device, where the third network device and/or the fourth network device do/does not belong to the first cell.

Another condition under which the UE selects the another cell (the neighboring cell other than the current cell) to perform random access is that the NUL bar timer used for the current cell is not activated (the NUL of the current cell may be accessed), the SUL bar timer used for the current cell is activated (the SUL of the current cell cannot be accessed), and as specified in the standard, the DL RSRP measured by the UE is less than the first threshold (sul-RSRP-Threshold), in other words, the UE may be relatively far away from the base station.

Embodiment 7. The method according to any one of Embodiments 1 to 6, where the first timer used for the first cell is activated in the following case:

when random access performed by the user equipment on the first uplink of the first network device in the first cell consecutively fails for N1 times; or a random access problem is reported for L1 times because random access performed by the user equipment on the first uplink of the first network device in the first cell fails; or the user equipment activates the first timer used for the first cell.

A condition under which the UE activates the NUL bar timer used for the current cell may be that random access performed by the UE on the NUL of the NR base station in the current cell consecutively fails for the N1 times, where N1 is a positive integer, and N1 usually may be equal to 10 or an integer multiple of 10 (for example, 20 or a default value), or that the random access problem (RA problem) is reported for the L1 times because random access performed by the UE on the NUL of the NR base station in the current cell consecutively fails. It is specified in the standard that the UE reports the random access problem when a quantity of consecutive failures of random access by the UE reaches a specific threshold.

Embodiment 8. The method according to any one of Embodiments 1 to 7, where the second timer used for the first cell is activated in the following case:

when random access performed by the user equipment on the second uplink of the first network device in the first cell consecutively fails for N2 times, or a random access problem is reported for L2 times because random access performed by the user equipment on the second uplink of the first network device in the first cell fails; or the user equipment activates the second timer of the first cell.

A condition under which the UE activates the SUL bar timer used for the current cell is that random access performed by the UE on the SUL of the NR base station in the current cell consecutively fails for the N2 times, where N2 is a positive integer, and N2 usually may be equal to 10 or an integer multiple of 10 (for example, 20 or a default value), or that the random access problem (RA problem) is reported for the L2 times because random access performed by the UE on the SUL of the NR base station in the current cell consecutively fails. It is specified in the standard that the UE reports the random access problem when a quantity of consecutive failures of random access by the UE reaches a specific threshold.

Embodiment 9. The method according to any one of Embodiments 1 to 8, where if random access performed by the user equipment by using the first uplink of the first network device in the first cell or the second uplink of the first network device in the first cell succeeds, the user equipment ends a random access process.

If random access performed by the UE on the NUL or the SUL succeeds (for example, at least a plurality of interactions that are required for random access and that are specified in the standard are completed), the UE may end the random access process.

Embodiment 10. The method according to any one of Embodiments 1 to 9, where the first network device is an NR network device (gNB), and the second network device is an LTE network device (eNB).

Both the first network device and the second network device may be network devices in the current cell.

Embodiment 11. The method according to any one of Embodiments 1 to 10, where when the user equipment receives the configuration information from the second network device, the second cell is a primary cell of the user equipment, and the first cell is a secondary cell of the user equipment.

An operator may deploy a plurality of NR network architectures. When the operator deploys an NSA (Non-standalone, non-standalone) network architecture, the UE needs to first access an LTE network (the second network device), and then obtains SUL configuration information. In an SA (Standalone, standalone) network architecture, the UE may directly obtain SUL configuration information by using an NR network (the first network device).

Embodiment 12. The method according to any one of Embodiments 1 to 11, where the third network device is an NR network device (gNB), and the fourth network device is an LTE network device (eNB).

Both the third network device and the fourth network device may be network devices in a neighboring cell of the current cell.

Embodiment 13. A terminal, where the terminal includes:
a processor, a memory, and a transceiver;
the transceiver is configured to receive and send data;
the memory is configured to store an instruction; and
the processor is configured to execute the instruction in the memory, to perform the method according to any one of Embodiments 1 to 12.

Embodiment 14. An apparatus, including:
a processing module and a communications interface, where
the processing module is configured to perform the method according to any one of Embodiments 1 to 12.

Embodiment 15. The apparatus according to Embodiment 14, including:
a storage module (for example, a memory), where the storage module is configured to store an instruction, and the processing module is configured to execute the instruction stored in the storage module, so that the processing module performs the method according to any one of Embodiments 1 to 12.

Embodiment 16. The apparatus according to Embodiment 14 or 15, where the apparatus is an element (for example, a chip) in a terminal.

The processor may be a central processing unit (central processing unit, CPU), a network processor (network processor, NP), or a combination of a CPU and an NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field-programmable gate array, FPGA), generic array logic (generic array logic, GAL) or another programmable logic device, a discrete gate or a transistor logic device, a discrete hardware component, or the like, or any combination thereof. The general purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include but is not limited to these memories and any other proper type of memory.

An embodiment of this application further provides a computer storage medium that stores a computer program. The computer program is used to perform the foregoing random access method.

An embodiment of this application further provides a computer program product including an instruction. When the computer program product is read and executed by a computer, the method in any one of the foregoing random access methods is performed.

An embodiment of this application further provides an apparatus applied to a terminal device. The apparatus is coupled to a memory, and is configured to read and execute a software program stored in the memory, so that the terminal device implements the method in any one of the foregoing random access methods.

The apparatus may be a chip or a system on chip (System on Chip). The memory may be integrated into the apparatus, or may be independent of the apparatus.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A random access method, implemented by a terminal device, wherein the random access method comprises:
    selecting a first uplink from at least two uplinks to perform random access;
    starting to perform random access using the first uplink;
    determining that performing random access using the first uplink fails when a prestored condition fails;
    selecting a second uplink from the at least two uplinks to perform random access after performing random access using the first uplink fails;
    performing random access using the second uplink; and
    selecting a third uplink to perform random access when random access using the second uplink cannot occur, wherein the third uplink is a communications link between the terminal device and a second network device,
    wherein the at least two uplinks are communications links between the terminal device and a first network device,
    wherein the first network device and the terminal device are located in a same cell,
    wherein the first uplink is a normal uplink (NUL), and
    wherein the second uplink is a supplementary uplink (SUL).

2. The random access method of claim 1, wherein random access using the first uplink cannot occur when one of the following conditions is met:
    a first quantity of consecutive failures of random access using the first uplink reaches N1, wherein N1 is a positive integer greater than or equal to 1;
    a second quantity of times of reporting a random access problem reaches L1 in response to random access using the first uplink failing, wherein L1 is a positive integer greater than or equal to 1; or
    a first timer of the first uplink activates in response to the first quantity reaching a first value or the second quantity reaching a second value in response to random access using the first uplink failing.

3. The random access method of claim 1, wherein random access using the second uplink cannot occur when one of the following conditions is met:
    a third quantity of consecutive failures of random access using the second uplink reaches N2, wherein N2 is a positive integer greater than or equal to 1;
    a fourth quantity of times of reporting a random access problem reaches L2 in response to random access using the second uplink failing, wherein L2 is a positive integer greater than or equal to 1; or
    a second timer of the second uplink activates in response to the third quantity reaching a third value or the fourth quantity reaching a fourth value in response to random access using the second uplink failing.

4. The random access method of claim 1, further comprising:
    measuring downlink reference signal received power; and
    selecting the first uplink to perform random access when the downlink reference signal received power is greater than or equal to a first threshold.

5. The random access method of claim 1, wherein when at least two first uplinks are NULs preconfigured for the terminal device, the random access method further comprises selecting each one of the at least two first uplinks based on a priority of the each one of the at least two first uplinks to perform random access until the random access succeeds.

6. The random access method of claim 1, wherein when at least two second uplinks are SULs preconfigured for the terminal device, the random access method further comprises selecting each one of the at least two second uplinks based on a priority of the each one of the at least two second uplinks to perform random access until the random access succeeds.

7. The random access method of claim 1, wherein the third uplink is a second NUL or a second SUL.

8. The random access method of claim 4 further comprising receiving configuration information from the first network device or a third network device, wherein the configuration information is for configuring the first threshold.

9. A random access apparatus comprising:
    a transceiver configured to receive and transmit data; and
    a processor coupled to the transceiver and configured to:
        select a first uplink from at least two uplinks to perform random access;
        start to perform random access using the first uplink;
        determine that performing random access using the first uplink fails when a prestored condition fails, wherein random access using the first uplink cannot occur when one of the following conditions is met:
            a first quantity of consecutive failures of random access using the first uplink reaches N1, wherein N1 is a positive integer greater than or equal to 1;
            a second quantity of times of reporting a random access problem reaches L1 in response to random access using the first uplink failing, wherein L1 is a positive integer greater than or equal to 1; or
            a first timer of the first uplink activates in response to the first quantity reaching a first value or the second quantity reaching a second value in response to random access using the first uplink failing;
        select a second uplink from the at least two uplinks to perform random access after performing random access using the first uplink fails; and
        perform random access using the second uplink, wherein the at least two uplinks are communications links between the apparatus and a first network device, wherein the first network device and the apparatus are located in a same cell, wherein the first uplink is a normal uplink (NUL), and wherein the second uplink is a supplementary uplink (SUL).

10. The random access apparatus of claim 9, wherein the processor is further configured to select a third uplink to perform random access when random access using the second uplink cannot occur, wherein the third uplink is a communications link between the apparatus and a second network device.

11. The random access apparatus of claim 10, wherein random access using the second uplink cannot occur when one of the following conditions is met:
   a third quantity of consecutive failures of random access using the second uplink reaches N2, wherein N2 is a positive integer greater than or equal to 1;
   a fourth quantity of times of reporting a random access problem reaches L2 in response to random access using the second uplink failing, wherein L2 is a positive integer greater than or equal to 1; or
   a second timer of the second uplink activates in response to the third quantity reaching a third value or the fourth quantity reaching a fourth value in response to random access using the second uplink failing.

12. The random access apparatus of claim 9, wherein the processor is further configured to:
   measure downlink reference signal received power; and
   select the first uplink to perform random access when the downlink reference signal received power is greater than or equal to a first threshold.

13. The random access apparatus of claim 9, wherein when at least two first uplinks are NULs preconfigured for the random access apparatus, the processor is further configured to select in turn each one of the at least two first uplinks based on a priority of the each one of the at least two first uplinks to perform random access until the random access succeeds.

14. The random access apparatus of claim 9, wherein when at least two second uplinks are SULs preconfigured for the random access apparatus, the processor is further configured to select in turn each one of the at least two second uplinks based on a priority of the each one of the at least two second uplinks to perform random access until the random access succeeds.

15. The random access apparatus of claim 10, wherein the third uplink is a second NUL or a second SUL.

16. The random access apparatus of claim 12, wherein the transceiver is further configured to receive configuration information from the first network device or a third network device, wherein the configuration information is used to configure the first threshold.

17. The random access apparatus of claim 16, wherein the first network device is a new radio (NR) network device, and wherein the third network device is a Long-Term Evolution (LTE) network device.

18. The random access apparatus of claim 16, wherein a first cell in which the first network device is located is a primary cell of the random access apparatus and a second cell in which the third network device is located is a secondary cell of the random access apparatus when the configuration information is from the first network device, and wherein the second cell is the primary cell and the first cell is the secondary cell when the configuration information is from the third network device.

19. The random access method of claim 1, further comprising:
   determining whether a value of downlink reference signal received power is greater than or equal to a first threshold and whether a first timer of the first uplink is not activated;
   performing the random access using the first uplink when the value of the downlink reference signal received power is greater than or equal to the first threshold and the first timer is not activated;
   determining, when the random access using the first uplink fails, whether a quantity of consecutive failures of random access reaches a first value or whether a quantity of times of reporting a random access problem reaches a second value; and
   activating the first timer when the quantity of consecutive failures of random access reaches the first value or the quantity of times of reporting the random access problem reaches the second value.

20. The random access method of claim 19, further comprising:
   determining whether a second timer of the second uplink is not activated;
   performing the random access using the second uplink when the second timer is not activated;
   determining, when the random access using the second uplink fails, whether a quantity of consecutive failures of random access reaches a third value or whether a quantity of times of reporting a random access problem reaches a fourth value;
   activating the second timer when the quantity of consecutive failures of random access reaches the third value or the quantity of times of reporting the random access problem reaches the fourth value; and
   performing the random access using the third uplink when the second timer is activated.

* * * * *